United States Patent
Pancolini

(10) Patent No.: US 10,782,022 B2
(45) Date of Patent: Sep. 22, 2020

(54) DEVICE FOR CONTROLLING THE COMBUSTION OF A BURNER

(71) Applicant: C.I.B. UNIGAS S.P.A., Padua (IT)

(72) Inventor: Riccardo Pancolini, Padua (IT)

(73) Assignee: C.I.B. UNIGAS S.P.A., Padua (IT)

(*) Notice: Subject to any disclaimer, the term of this patent is extended or adjusted under 35 U.S.C. 154(b) by 225 days.

(21) Appl. No.: 15/118,400

(22) PCT Filed: Feb. 11, 2015

(86) PCT No.: PCT/IB2015/051015
§ 371 (c)(1),
(2) Date: Aug. 11, 2016

(87) PCT Pub. No.: WO2015/121800
PCT Pub. Date: Aug. 20, 2015

(65) Prior Publication Data
US 2017/0167726 A1    Jun. 15, 2017

(30) Foreign Application Priority Data

Feb. 12, 2014 (IT) ............................... VR2014A0036

(51) Int. Cl.
*F23N 1/02* (2006.01)
*F23N 5/02* (2006.01)
(Continued)

(52) U.S. Cl.
CPC ............ *F23N 1/022* (2013.01); *F23N 1/102* (2013.01); *F23N 5/02* (2013.01); *F23N 5/18* (2013.01);
(Continued)

(58) Field of Classification Search
CPC ... F23N 5/02; F23N 5/18; F23N 1/102; F23N 5/242; F23N 2241/18; F23N 2241/06;
(Continued)

(56) References Cited

U.S. PATENT DOCUMENTS

| | | | |
|---|---|---|---|
| 4,138,725 A | | 2/1979 | Ikemoto et al. |
| 4,221,193 A | * | 9/1980 | Ezoe ..................... F02D 41/123 123/483 |

(Continued)

FOREIGN PATENT DOCUMENTS

| | | |
|---|---|---|
| DE | 10348324 B3 | 5/2005 |
| JP | S58148314 A | 9/1983 |
| JP | S6484021 A | 3/1989 |
| JP | H08313318 A | 11/1996 |
| WO | 9614548 A1 | 5/1996 |

OTHER PUBLICATIONS

International Search Report for PCT/IB2015/051015, 2 pages.

*Primary Examiner* — Grant Moubry
*Assistant Examiner* — Rabeeul I Zuberi
(74) *Attorney, Agent, or Firm* — Ference & Associates LLC

(57) ABSTRACT

Described is a device (11) for controlling the combustion of a burner (1), comprising: •first means (12) for measuring the fuel flow rate (Vg); •second means 13 for measuring the flow rate of the comburent (Va) •first operator means (14) for controlling the opening of an inlet valve (5) as a function of the quantity of fuel to be supplied to the burner (1); •second operator means (15) for controlling the comburent flow regulator means (8) as a function of the quantity of comburent to be supplied to the burner (1); According to this invention, the device (11) comprises a unit (16) for controlling the first operator means (14) and the second operator means (15) as a function of the values measured by the first measuring means (12) and by the second measuring means (13).

17 Claims, 11 Drawing Sheets

(51) Int. Cl.
  *F23N 5/18* (2006.01)
  *F23N 5/24* (2006.01)
  *F23N 1/10* (2006.01)
  *G01F 1/684* (2006.01)
  *G01F 5/00* (2006.01)

(52) U.S. Cl.
  CPC ........... *F23N 5/242* (2013.01); *G01F 1/6842* (2013.01); *G01F 5/00* (2013.01); *F23N 2225/06* (2020.01); *F23N 2225/08* (2020.01); *F23N 2225/26* (2020.01); *F23N 2233/08* (2020.01); *F23N 2237/00* (2020.01); *F23N 2241/02* (2020.01); *F23N 2241/04* (2020.01); *F23N 2241/06* (2020.01); *F23N 2241/18* (2020.01); *F23N 2900/00* (2013.01)

(58) Field of Classification Search
  CPC ............. F23N 2241/04; F23N 2241/02; F23N 2237/00; F23N 2233/08; F23N 2225/26; F23N 2225/08; F23N 2225/06
  See application file for complete search history.

(56) References Cited

U.S. PATENT DOCUMENTS

| | | | |
|---|---|---|---|
| 4,498,863 A | | 2/1985 | Hanson et al. |
| 4,576,570 A | | 3/1986 | Adams et al. |
| 4,585,161 A | | 4/1986 | Kusama et al. |
| 4,717,468 A | * | 1/1988 | Funk .................... B01D 3/4255 196/132 |
| 5,544,527 A | * | 8/1996 | Kitahara ............... G01F 1/6842 73/204.21 |
| 5,601,071 A | * | 2/1997 | Carr ....................... F23N 1/022 126/110 R |
| 5,667,375 A | * | 9/1997 | Sebastiani ............. F23D 14/045 126/116 A |
| 6,018,994 A | | 2/2000 | Yonezawa et al. |
| 6,019,593 A | * | 2/2000 | Lewandowski ......... F23D 14/36 431/12 |
| 9,859,579 B2 | * | 1/2018 | Yoon ................. H01M 8/04686 |
| 2003/0013053 A1 | * | 1/2003 | Dutescu .................... F23G 5/14 431/5 |
| 2013/0045077 A1 | | 2/2013 | Metz et al. |

* cited by examiner

DEVICE FOR CONTROLLING THE COMBUSTION OF A BURNER

This invention relates to a device for controlling the combustion of a burner, a burner comprising the control device and a method for controlling the combustion of the burner.

Preferably, this invention defines a control of the mixing between a fuel and a comburent in order to control the combustion in a burner.

This invention relates to burners used both in the civil sector (for example, for thermal heating) and in industrial sector (for example, for the production of heat in general, for ovens, for heating air, etc.).

More specifically, this invention is used in non-premixed burners, that is to say, in those burners where the mixing of the comburent and fuel occurs directly at a head of the burner.

According to the prior art, a burner comprises an inlet duct for a fuel (usually a gas fuel) and an inlet duct for a comburent (usually air). These inlet ducts merge at a combustion zone where the head of the burner is present. In this way, the mixing of the comburent with the fuel performs a combustion (when activated by an ignition spark) for heating, for example, a liquid.

Usually, a burner comprises a valve for adjusting the fuel gas positioned along the inlet duct of the fuel for adjusting the quantity of gas which is supplied to the head. Similarly, the burner also comprises an opening with a variable cross-section positioned along the comburent air inlet duct for adjusting the quantity of air which is supplied to the head.

Also, there are two known techniques for controlling the valve for regulating the gas and the air inlet opening section.

According to a first prior art technique, the movement of the gas regulating valve and the air inlet opening section are both of the mechanical type. In other words, the adjustment of the valve and the inlet section is achieved by the movement of the respective movable cams constructed on the basis of an air/gas ratio curve predetermined during testing. The movement of the cam is controlled by a control unit as a function of measured temperature and pressure values (for example, on the steam of a boiler). Also, the movement of the cams requires a manual adjustment which is performed by a trained installer during installation in such a way as to construct an air/gas ratio curve depending on the operating power of the burner in the system in such a way as to obtain an optimum excess air value during the air/gas modulating operations.

According to a second prior art technique, the control of the gas regulating valve and the air inlet opening section are both of the electronic type. In this case, the adjustment of the valve and the inlet section is performed electronically on the basis of a predetermined air/gas ratio curve stored in a memory unit. In addition, this adjustment is performed as a function of the values of the burnt gases measured by a specific sensor for measuring the $O_2$ and/or CO contained in the fumes. In this case, the control unit 16 is configured to keep the combustion at an optimum level according to the excess air index curve. In addition, the control unit is configured to automatically modulate the burner in a high safety curve (with the $O_2$ at least 1% greater than the corresponding value on the air/gas ratio curve) if an excess air index is reached which is too low.

In any case, during installation, the trained operator must manually create the ratio air/gas curves, which are stored in the memory unit, gradually increasing the opening of the gas and observing the trend of the $O_2$ and/or CO.

However, these prior art techniques have several drawbacks.

A first drawback is linked to the fact that, in both cases, at least a first intervention is necessary by a trained operator for setting/adjusting the air/gas ratio curve during installation. This operation necessarily requires the presence of a trained operator since the correct (or incorrect) operation of the burner depends on the adjustment.

A second drawback, linked to the first, is that, once the adjustment is performed by the trained operator, the operation of the burner is based on the air/gas ratio curve which has been set. Consequently, a variation of the air and/or gas parameters or alterations in the operation of the components of the burner linked, for example, to the wear of the mechanical parts over time, could result in the burner operating in non-optimum conditions since the air/gas curve set is no longer suitable.

In effect, the burner is controlled by constructing an air/gas ratio curve during the first switching ON of the burner using a suitable fumes analysis instrument and by a trained technician, but never during the operation of the burner. Consequently, a variation in the fuel or comburent parameters might cause a defective combustion (even though it falls within the safety parameters of the burnt gases) or it might not reach the degree of power required.

Alternatively, it is necessary to regularly request the intervention of the trained operator in order to make adjustments to the burner. However, even the latter solution has inherent drawbacks due to the call-out times of the operator (which can be lengthy) and the relative costs of the intervention.

In this situation, the purpose of this invention is to provide a device for controlling the combustion of a burner, a burner and a method for controlling the combustion of the burner which overcome the above-mentioned drawbacks.

More specifically, the aim of this invention is to provide a device for controlling the combustion which allows the optimum air/gas ratio to be maintained during the operation of the burner.

Another aim of this invention to provide a device for controlling the combustion which allows the air/gas ratio to be controlled automatically during operation of the burner.

Lastly, another aim of this invention to provide a device for controlling the combustion which allows the air/gas ratio to be controlled automatically during operation of the burner as a function of variations of the fuel and comburent parameters.

The purposes indicated are substantially achieved by a device for controlling the combustion of a burner, a burner and a method for controlling the combustion of the burner as described in the claims herein. Other features and advantages of this invention are more apparent in the detailed description below, with reference to non-limiting and non-exclusive preferred embodiments of a device for controlling the combustion of a burner, a burner and a method for controlling the combustion of the burner as illustrated in the accompanying drawings, in which:

Figure 1:
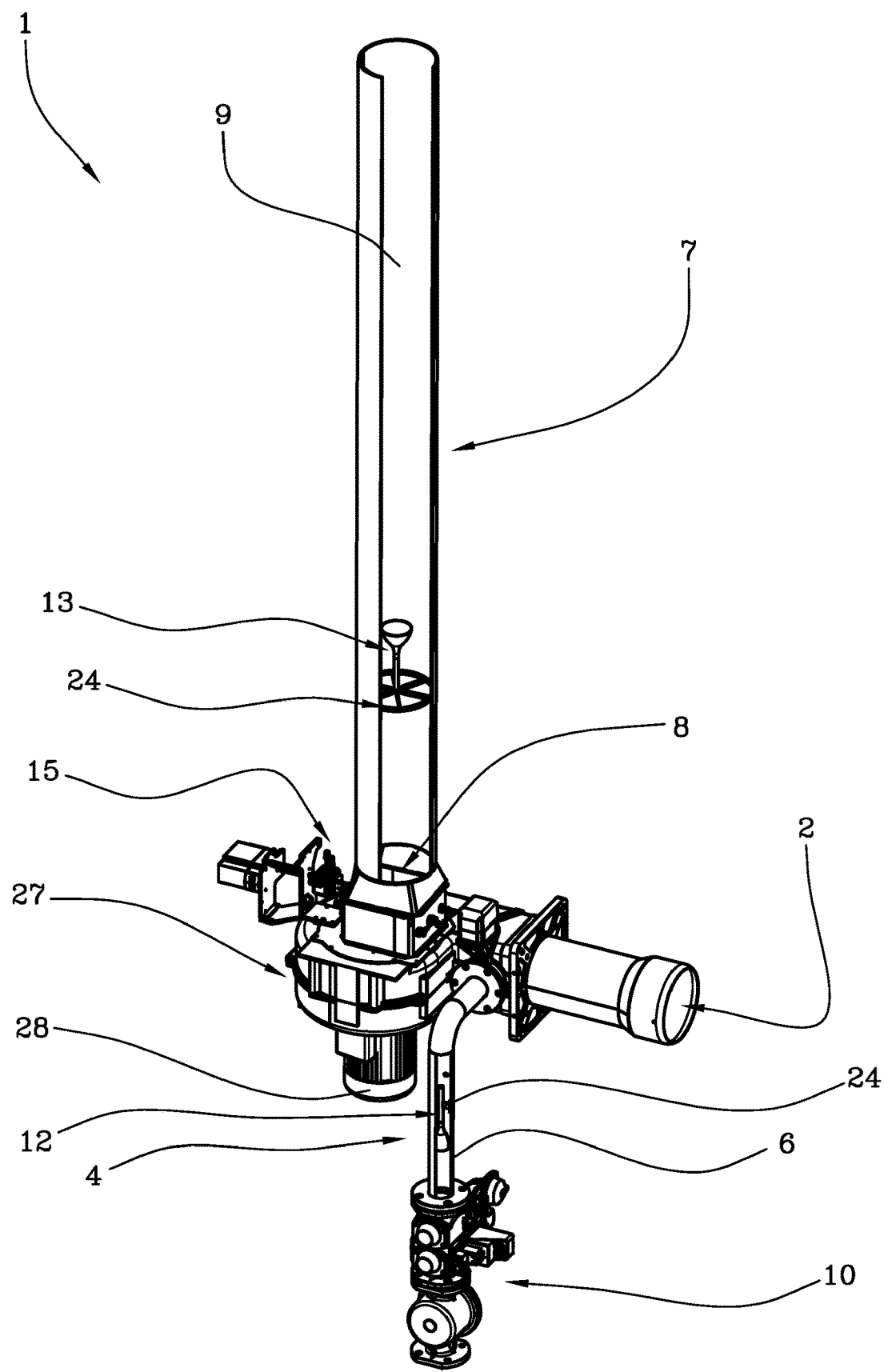
FIG. 1 shows a partly cross sectioned axonometric view of a burner according to this invention.

With reference to the above-mentioned figures, the numeral 1 denotes in its entirety a burner according to this invention.

Preferably, the burner 1 comprises a head 2 at which a combustion zone 3 is defined in which the combustion occurs.

Even more preferably, the burner 1 is of the non-premixed type (mixing between the fuel and the comburent occurs directly on the head 2 and not before).

More specifically, the burner 1 comprises a first fuel inlet 4 in which there is an inlet valve 5 for adjusting the quantity of fuel supplied. Preferably, the first inlet 4 is defined by a duct for conveying the fuel 6 along which the inlet valve 5 is positioned. The duct for conveying the fuel 6 extends in the direction of the combustion zone 3 for feeding the fuel.

The inlet valve 5 intercepts the fuel and is configured for adjusting the quantity of fuel in transit through the first inlet 4 towards the combustion zone 3. The inlet valve 5 is of known type and will not be described below in further detail.

It should be noted that the fuel is a fluid and may be of a liquid or gaseous type. Preferably, the fuel comprises methane or GPL or biogas or a combination of these substances or other substances which are still able to burn in a combustion and not expressly mentioned here.

In addition, the burner 1 comprises a second inlet 7 for the comburent extending in the direction of the combustion zone 3 for feeding the comburent to the latter. More in detail, the second inlet 7 comprises means 8 for adjusting the quantity of comburent fed towards the combustion zone 3.

Preferably, the second inlet 7 comprises a duct 9 for conveying the comburent along which the adjustment means 8 are positioned. The duct 9 for conveying the comburent extends in the direction of the combustion zone 3 for feeding the comburent.

The conveying duct 9 extends along a respective axis of extension 29 starting from a respective inlet end 30 of the comburent.

More specifically, in the embodiment illustrated in FIGS. 10 to 13, the second inlet 7 comprises an element 31 for deflecting the incoming comburent configured for entering the comburent in a radial direction relative to the axis of extension of the conveyor duct 9.

The deflector element 31 is shaped in the form of a cap and is positioned at the inlet end 30 of the comburent. In other words, the second inlet 7 comprises the conveying duct 9 and the deflector element 31. The deflector element 31 defines the initial part of the second inlet 7 for the entrance of the comburent.

In addition, the deflector element 31 has a respective internal cross-section larger than the cross-section of the inlet end 30 in such a way as to form a cylindrical air inlet zone 32 between the duct of the second inlet 7 and the deflector element 31. The deflector element 31 defines a path for the infeed of the comburent shaped and defining a reversal of the feed direction of the comburent at the inlet end 30 of the conveying duct 9.

Figure 12:
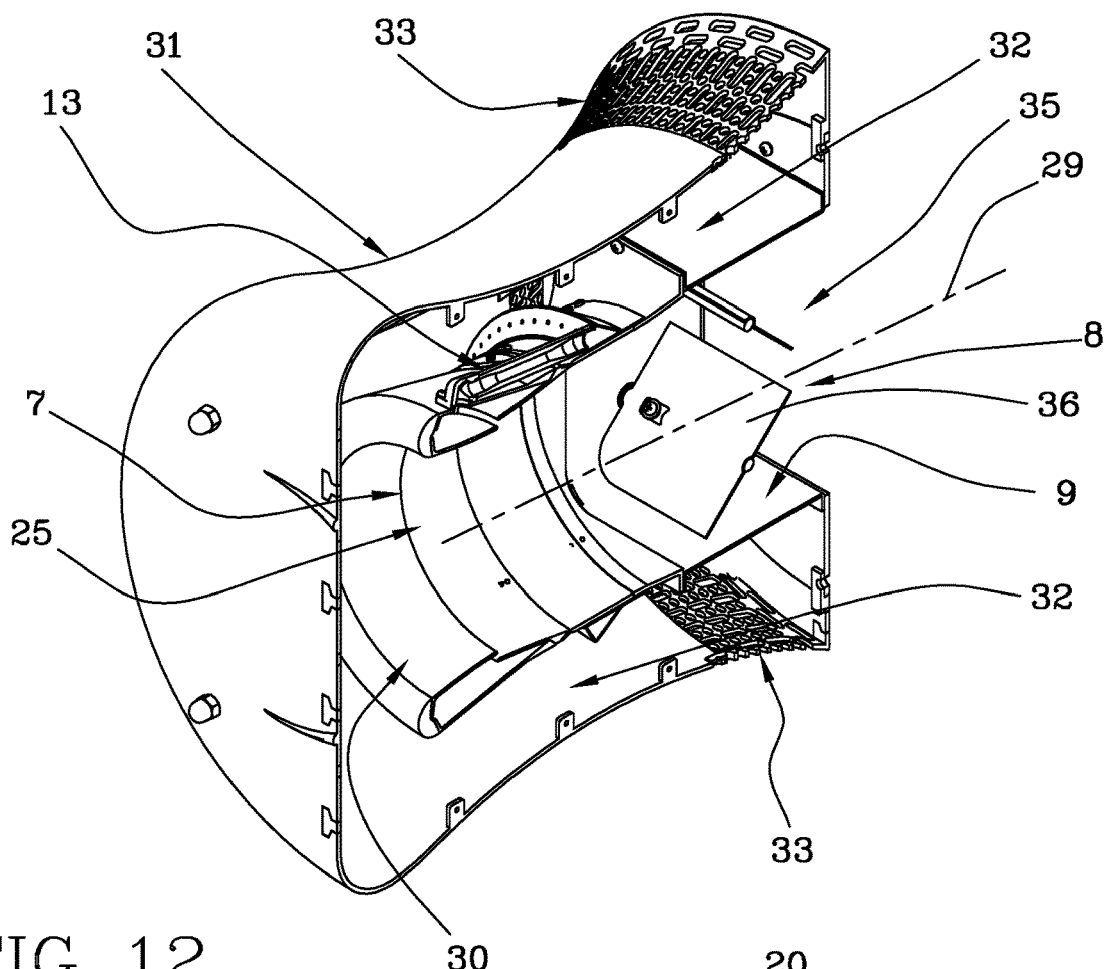
FIG. 12 shows a cross sectioned axonometric view of a detail of the alternative embodiment of the burner of FIG. 11.

The deflector element 31 has at least one inlet passage 33 for the comburent extending radially relative to the axis of extension 29 and located in a position away from the inlet end 30 along the duct. FIG. 12 shows that the inlet passage 33 extends along a crown positioned on the cap-shaped deflector element 31 and is defined by a plurality of through holes. The remaining structure of the deflector element 31 is, on the other hand, closed.

Figure 2:
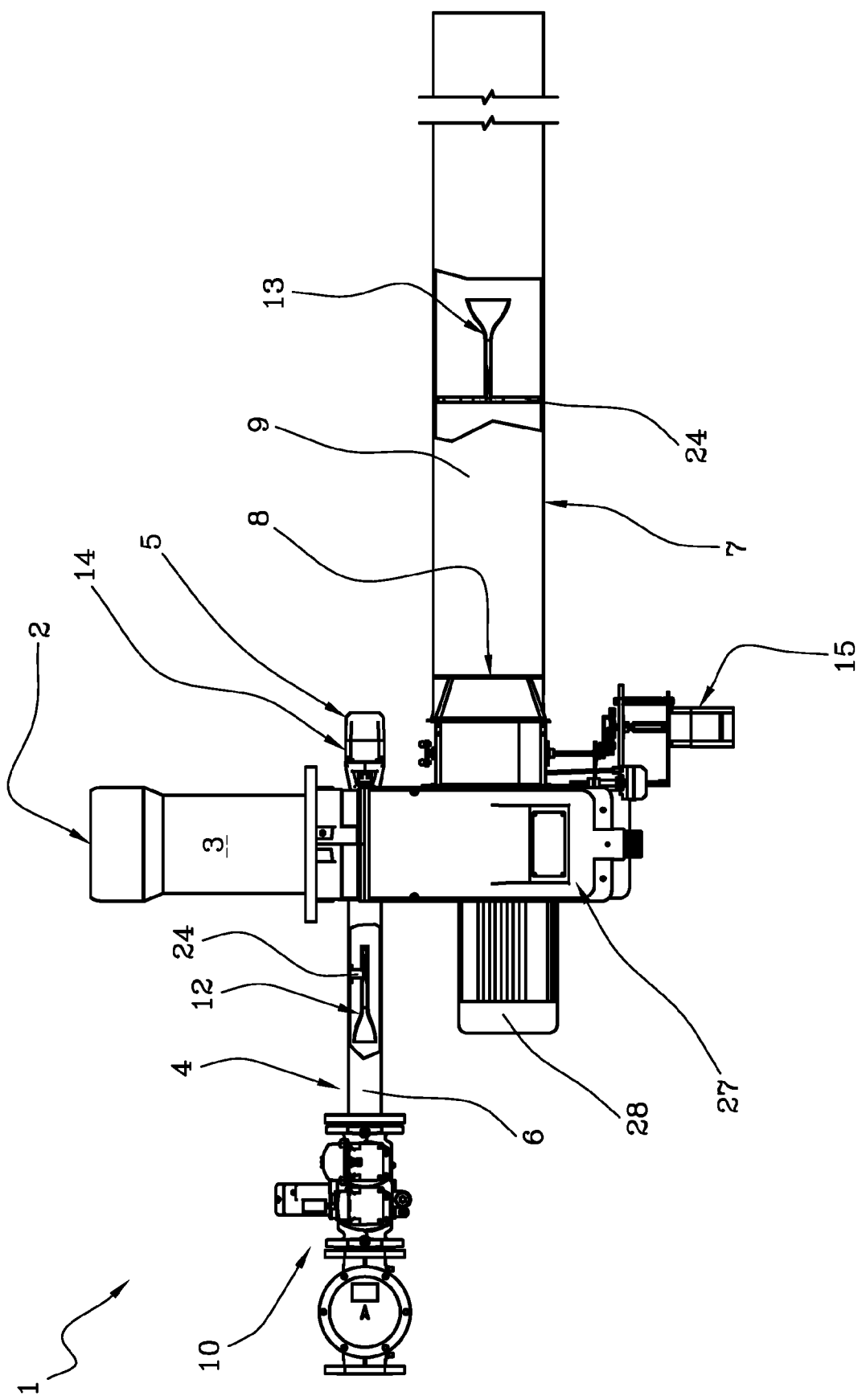
FIG. 2 shows a partly cross sectioned side view of the burner of FIG. 1.
Figure 13:
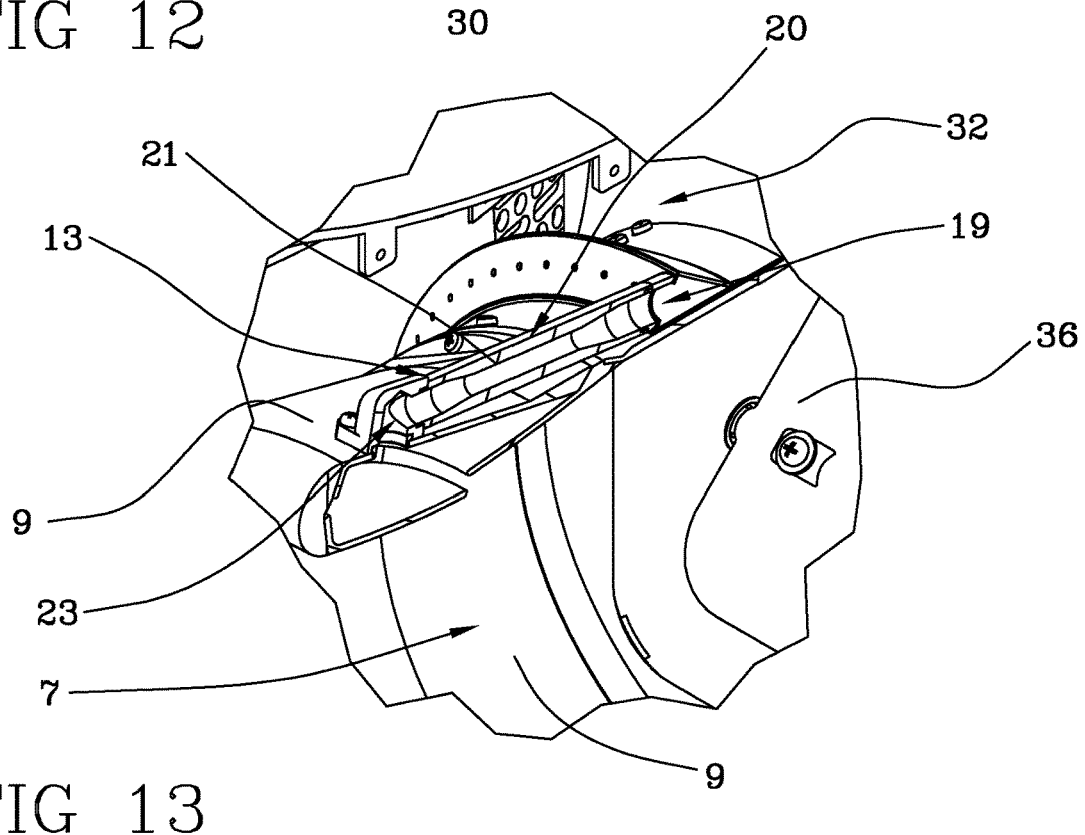
FIG. 13 shows a cross sectioned axonometric view of an enlargement of the detail of the alternative embodiment of FIG. 12.

In the embodiments illustrated in FIGS. 2, 12 and 13, the adjustment means 8 have an opening 35 with an adjustable cross section for adjusting the quantity of comburent supplied. Preferably, the adjustment means 8 have one or more shutters 36 with an inclination adjustable relative to the direction of propagation of the comburent as a function of the quantity of comburent to be fed.

It should be noted that the burner comprises, advantageously, a fan 27 for feeding air (not visible in the accompanying drawings) in the direction of the head 2 for feeding air in the combustion zone 3. Advantageously, the burner comprises a duct for feeding air which extends from the fan 27 for feeding air to the head 2 in such a way as to channel the air towards the combustion zone 3. The fan 27 for feeding air is moved by a motor 28 preferably electric (shown in FIGS. 1 and 2).

In an alternative embodiment not illustrated in the accompanying drawings, the adjustment means 8 comprise, as well as the opening 35 with an adjustable cross section, a module for adjusting the rpm of the fan 27 for feeding air. In effect, the fan 27 for feeding air is of the adjustable output type in such a way as to vary the quantity of air pushed towards the combustion zone 3. Preferably, the module for adjusting the rpm of the fan 27 is configured to act on the electric feeder of the fan 27 (usually defined by an inverter).

As already partly mentioned, the burner 1 has a combustion zone 3 where the first inlet 4 and the second inlet 7 merge and where the fuel and the comburent mix to allow combustion to take place.

In addition, the burner 1 comprises a pressure stabilizing valve 10 the positioned along the first inlet 4 upstream of the combustion zone 3. Preferably, the pressure stabilizing valve 10 is positioned along the duct for conveying the fuel 6 and is configured to keep the fuel pressure constant between the stabilizing valve 10 and the inlet valve 5. The stabilizing valve 10 is of known type and will not be described below in further detail.

In addition, the burner 1 comprises a device 11 for controlling the combustion which is also the object of this invention.

More specifically, the control device 11 comprises first means 12 for measuring the flow of fuel Vg supplied to the burner 1.

The first measuring means 12 are interposed along the first inlet 4. In other words, the first measuring means 12 are located inside the duct for conveying the fuel 6.

Preferably, the first measuring means 12 comprise a sensor 34 configured to measure the flow of fuel Vg. Even more preferably, the sensor 34 of the first measuring means 12 is of the instantaneous measuring type. In other words, the sensor 34 is designed for instantaneously measuring the value relative to the flow rate of the fuel Vg. In addition, the sensor 34 of the first measuring means 12 is advantageously positioned at the centre of the duct for conveying the fuel 6.

Figure 4:
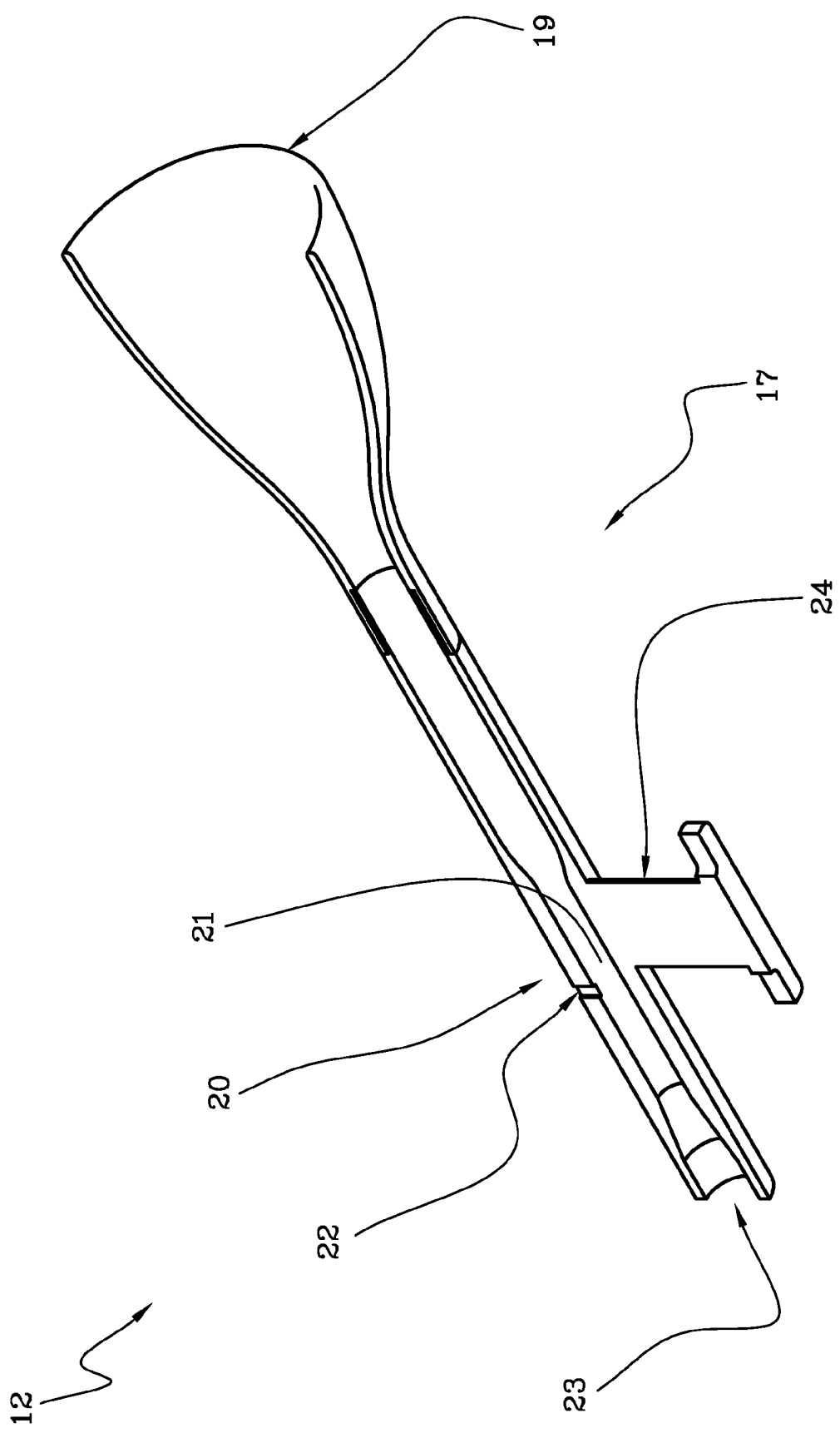
FIG. 4 shows a cross sectioned axonometric view of a first detail of the burner of FIG. 1.
Figure 5:
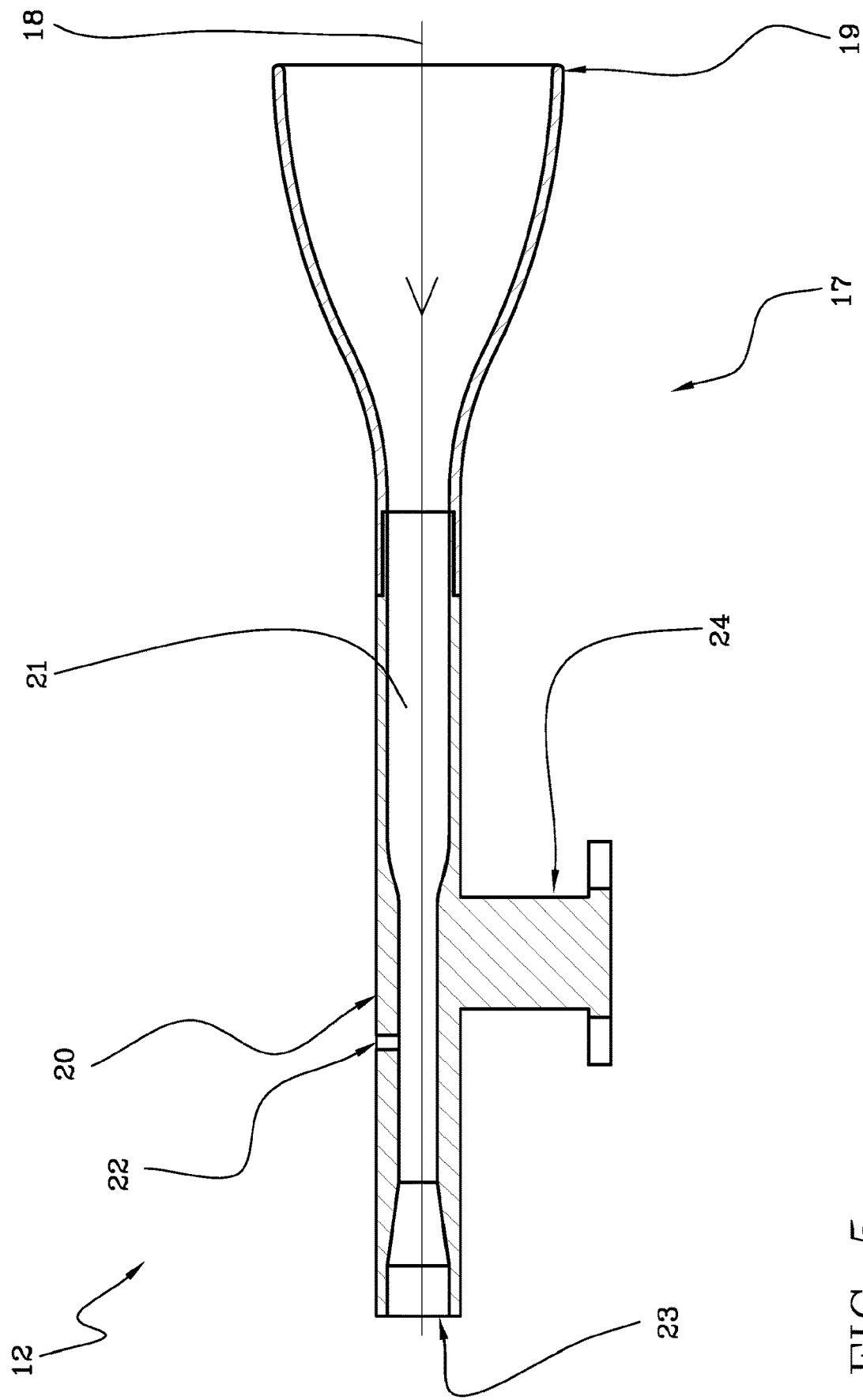
FIG. 5 shows a cross sectioned side view of the first detail illustrated in FIG. 4.

FIGS. 4 and 5 show an embodiment of the first measuring means 12. More in detail, the first measuring means 12 comprise a conveyor 17 having a narrowing along the direction of feeding 18 the fuel. Even more in detail, the conveyor 17 comprises a wide end 19 positioned at the suction area of the fuel and a narrow end 20 positioned downstream of the wide end 19 according to the feed direction 18 of the fuel. The narrow end 20 defines inside a duct 21 for passage of the fuel where, due to the narrowing of the passage section, the speed of the fuel increases.

The measuring sensor 34 of the conveyor 17 extends transversely to the feeding direction of the comburent and projects inside the narrow end 20. More specifically, the measuring sensor 34 is configured for directly measuring the flow rate of the fuel. Preferably, the measuring sensor 34 is an anemometer of the hot film or hot wire type.

It should be noted that the conveyor 17 is positioned inside the first inlet 4 and defines an internal passage section which is less than the section of the first inlet 4 in such a way that most of the fuel passes outside the respective conveyor 17. In this way, the part of the fuel which is influenced by the presence of the conveyor and which enters into it is a minimum relative to the fuel which passes inside the first inlet 4.

More specifically, the conveyor 17 occupies a reduced part of the space inside the first inlet 4 and the fuel which passes inside the first inlet 4 partly enters inside the conveyor 17 and partly (the majority) passes outside the conveyor 17 between the latter and the first inlet 4.

It should be noted that the first inlet 4 is defined by a duct inside of which there is the conveyor 17. Preferably, the conveyor 17 is located in an intermediate position according to both a direction radial to the duct and according to a longitudinal direction.

In an alternative embodiment not illustrated in the accompanying drawings, instead of the wide portion 19, the conveyor 17 comprises elements of different sizes based on the speed gradient of the flow which is wanted next to the sensor 34.

More specifically, the sensor 34 (shown in FIGS. 8 and 9) of the first measuring means is positioned at the narrow end 20 inside a hole 22 extending transversely to the feed direction 18 of the fuel. Preferably, the sensor 34 is positioned transversely to the feed direction 18 of the fuel and projects in a cantilever fashion inside the passage duct 21 in such a way as to be exposed to the passage of the fuel and to measure the flow rate.

In addition, the conveyor 17 has a final re-widening 23 at the part of it furthest away from the wide portion 19 previously defined.

Also, FIGS. 4 and 5 show that the first measuring means 12 comprise a support 24 configured to keep the conveyor 17 in a central position (FIG. 1) relative to the transversal cross-section of the first inlet 4 in such a way that the flow of fuel which strikes the conveyor 17 is concentrated uniformly at the inlet, defined by the wide end 19, and that this feels as little as possible the turbulent effects due to the roughness, even though very limited, of the inner wall of the duct. More specifically, the support 24 may have various configurations. Preferably, in the case of the sensor 34 for the fuel, the support 24 is formed by a wing protruding from the inner wall of the first inlet 4.

Figure 8:
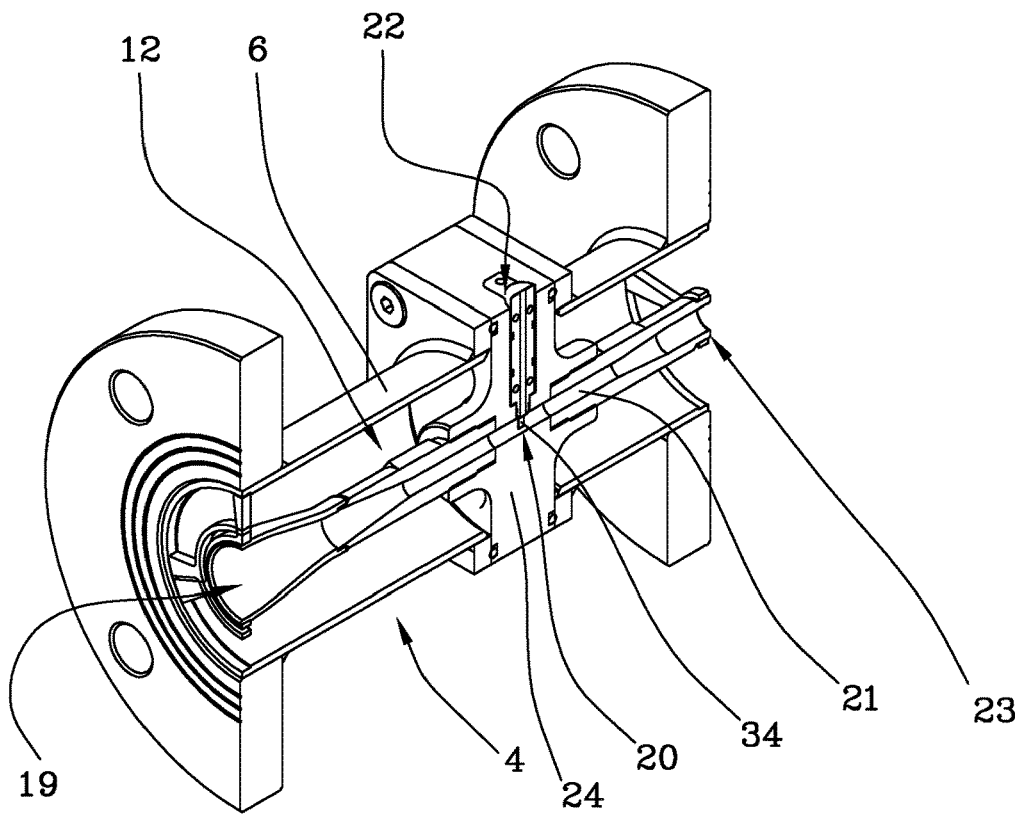
FIG. 8 shows a cross sectioned axonometric view of a variant of the first detail illustrated in FIG. 4.
Figure 9:
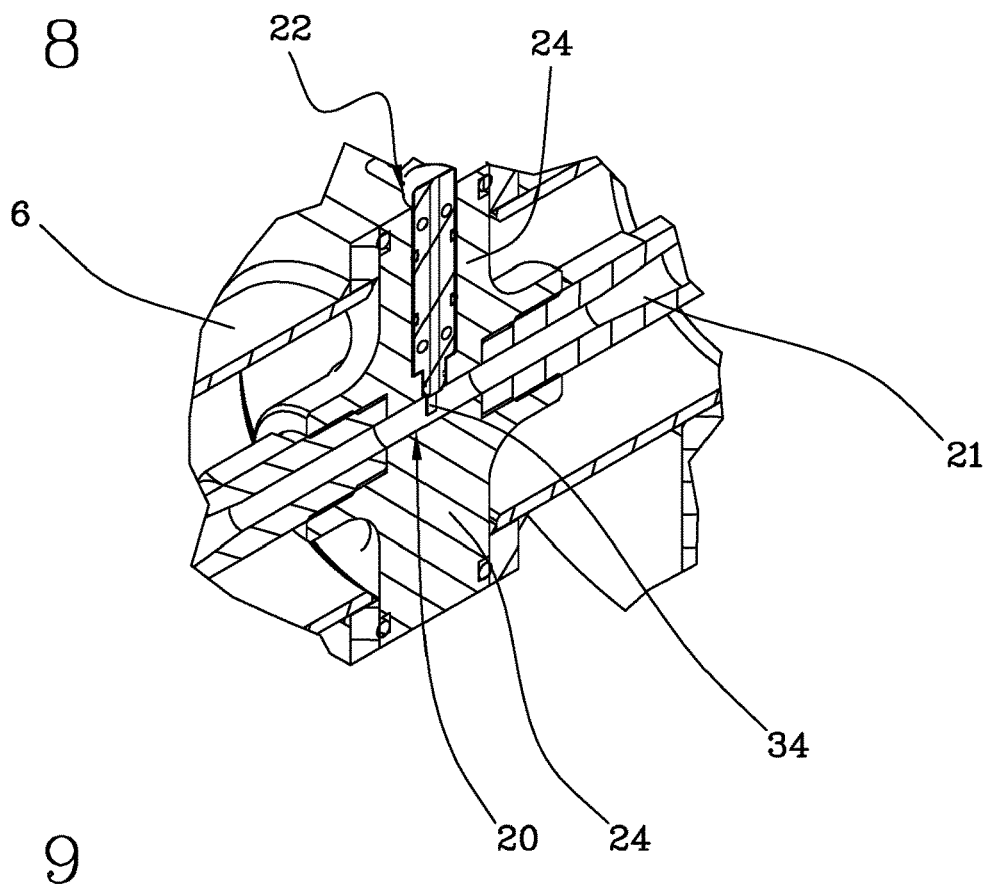
FIG. 9 shows a cross sectioned axonometric side view of an enlargement of the variant of FIG. 8.
Figure 10:
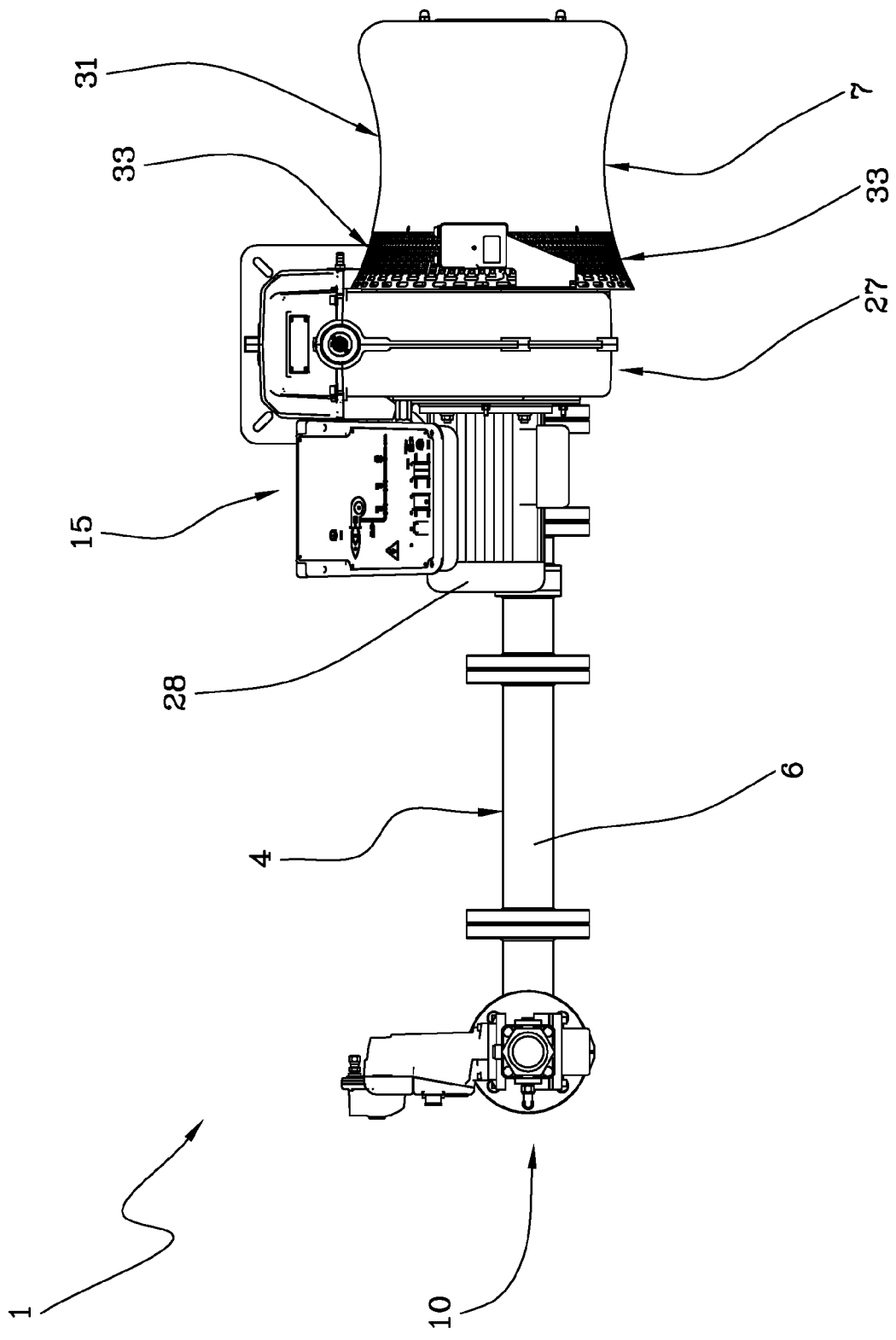
FIG. 10 shows a side view of an alternative embodiment of the burner of FIG. 1.
Figure 11:
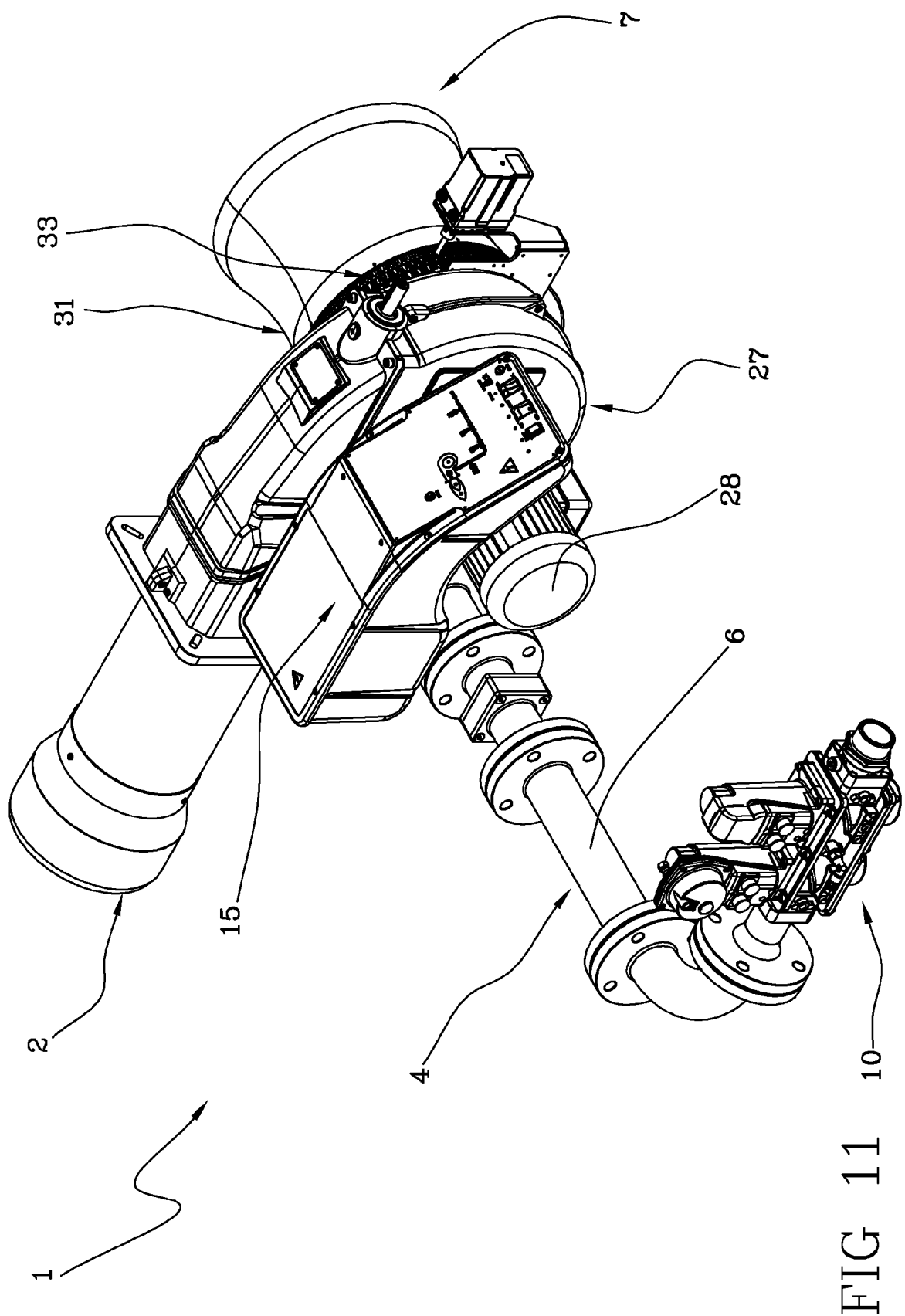
FIG. 11 shows an axonometric view of the alternative embodiment of the burner of FIG. 10.

FIGS. 8 and 9 show the conveyor 17 mounted inside the duct of the first inlet 4 and connected to the latter by the support 24. Preferably, in FIGS. 8 and 9 the support 24 incorporates the sensor 34 and is flanged at its relative parts diametrically opposite each other in such a way as to support the two sections of pipe of different extension in positions symmetrical relative to each other. This allows self-supporting and simultaneously centring of the conveyor 17 inside the duct of the first inlet 4.

Also, the device 11 comprises second means 13 for measuring the flow rate of the comburent Va supplied to the burner 1.

The second measuring means 13 are interposed along the second inlet 7.

In a first embodiment illustrated in FIGS. 1 and 2, the second measuring means 13 are positioned along the duct 9 for conveying the comburent.

In a second embodiment illustrated in FIGS. 10 to 13 the second measuring means 13 are positioned inside the deflector element 31 as described in more detail below.

In any case, the second measuring means 13 comprise a sensor 34 configured to measure the flow rate of the comburent Va. Even more preferably, the sensor 34 of the second measuring means 13 is of the instantaneous measuring type. In other words, the sensor 34 is designed for instantaneously measuring the value relative to the flow rate of the comburent Va. As shown in FIG. 1, the sensor 34 of the second measuring means 13 is advantageously positioned at the centre of the duct 9 for conveying the comburent.

Figure 6:
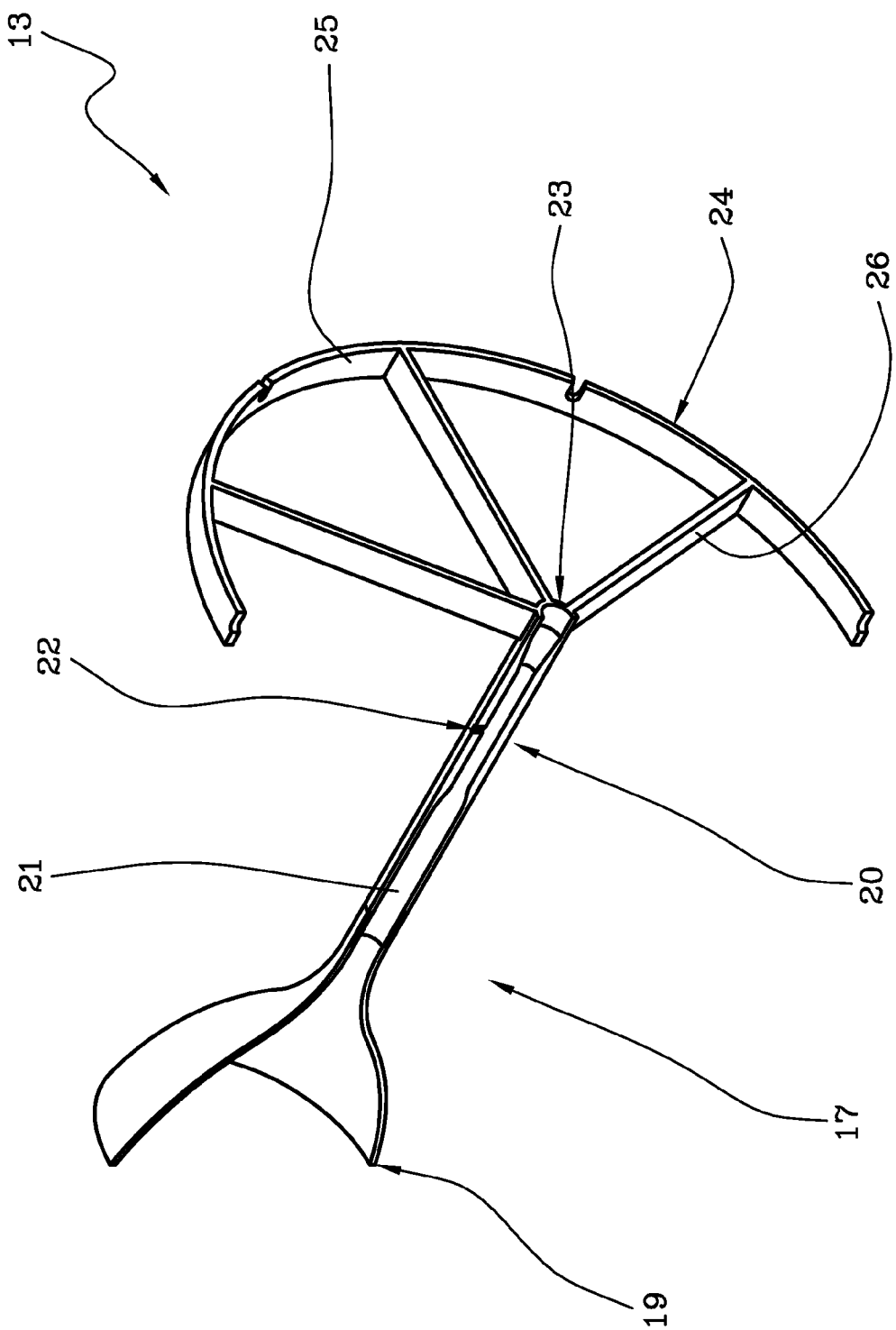
FIG. 6 shows a cross sectioned axonometric view of a second detail of the burner of FIG. 1.
Figure 7:
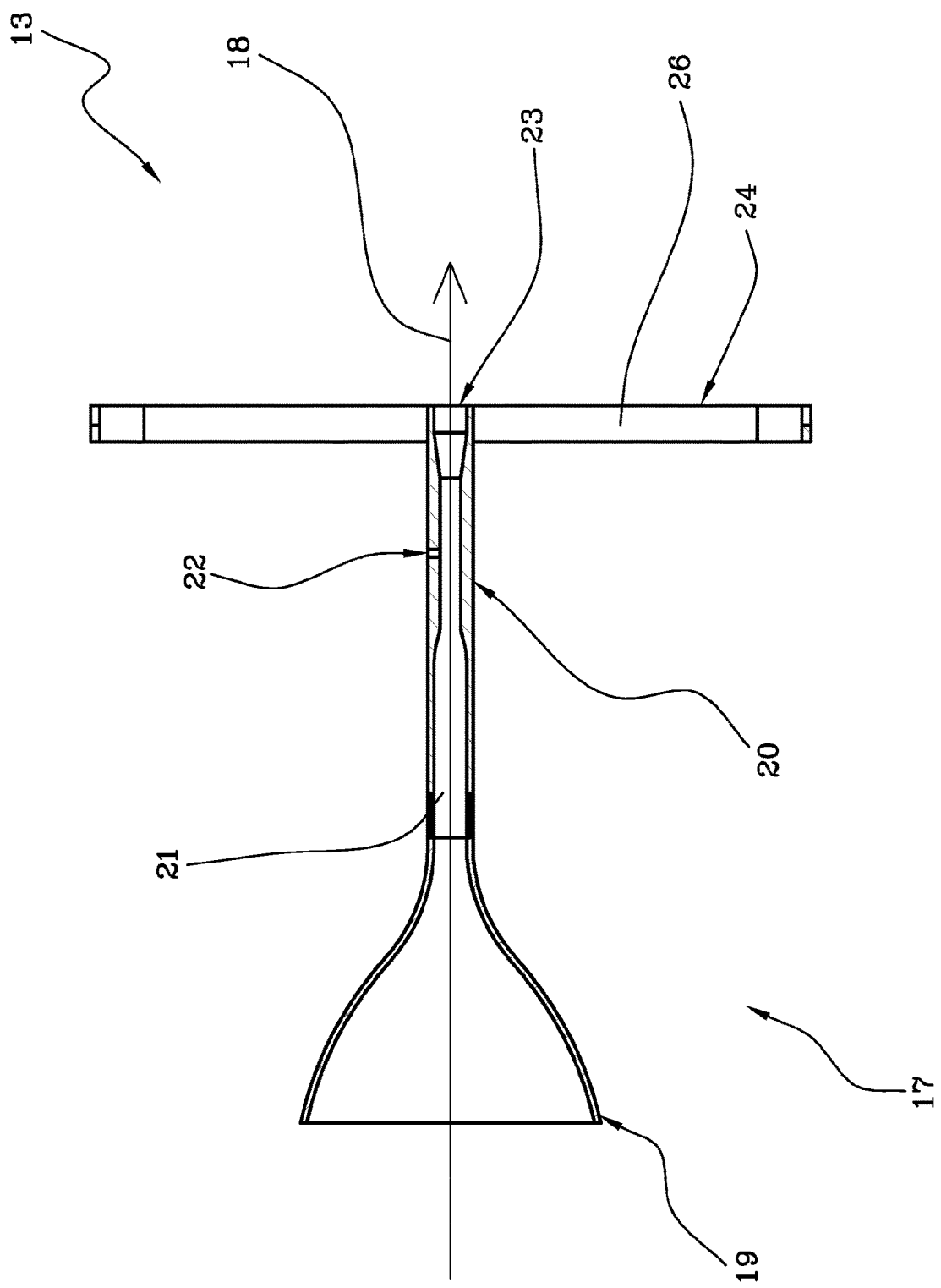
FIG. 7 shows a cross sectioned side view of the second detail illustrated in FIG. 6.

As described above for the sensor 34 of the first measuring means 12, FIGS. 6 and 7 show the preferred embodiment of the second measuring means 13. More in detail, the second measuring means 13 comprise (for simplicity the same numbers indicated for the first measuring means 12 will be used) a conveyor 17 having a narrowing along the direction of feeding 18 of the comburent. Even more in detail, the conveyor 17 comprises a wide end 19 positioned at the suction area of the comburent and a narrow end 20 positioned downstream of the wide end 19 according to the feed direction 18 of the comburent. The narrow end 20 defines inside a duct 21 for passage of the comburent where, due to the narrowing of the passage section, the speed of the comburent increases.

The measuring sensor 34 of the conveyor 17 extends transversely to the feeding direction of the comburent and projects inside the narrow end 20. More specifically, the measuring sensor 34 is configured for directly measuring the flow rate of the comburent. Preferably, the measuring sensor 34 is an anemometer of the hot film or hot wire type.

It should be noted that the conveyor 17 is positioned inside the second inlet 7 and defines an internal passage section which is less than the section of the second inlet 7 in such a way that most of the comburent passes outside the respective conveyor 17. In this way, the part of the comburent which is influenced by the presence of the conveyor and which enters into it is a minimum relative to the comburent which passes inside the second inlet 7.

More specifically, the conveyor 17 occupies a reduced part of the space inside the second inlet 7 and the comburent which passes inside the second inlet 7 partly enters inside the conveyor 17 and partly (the majority) passes outside the conveyor 17 between the latter and the second inlet 7.

In an alternative embodiment not illustrated in the accompanying drawings, instead of the wide portion 19, the conveyor 17 comprises elements of different sizes based on the speed gradient of the flow which is wanted next to the sensor 34.

More specifically, the sensor 34 (not shown in the accompanying drawings) of the second measuring means 13 is positioned at the narrow end 20 inside a hole 22 extending transversely to the feed direction 18 of the comburent. Preferably, the sensor 34 is positioned transversely to the feed direction 18 of the comburent and projects in a cantilever fashion inside the passage duct 21 in such a way as to be exposed to the passage of the comburent and to measure the flow rate.

In addition, the conveyor 17 has a final re-widening 23 at the part of it furthest away from the wide portion 19 previously defined.

It should be noted that in a first embodiment illustrated in FIGS. 1 and 2, the conveyor 17 is located inside the conveying duct 9.

Also, FIGS. 6 and 7 show that the second measuring means 13 comprise a support 24 configured to keep the conveyor 17 in a central position (FIG. 1) relative to the transversal cross-section of the second inlet 7 in such a way that the flow of comburent which strikes the conveyor 17 is concentrated uniformly at the inlet, defined by the wide end 19, and that this feels as little as possible the turbulent effects due to the roughness, even though very limited, of the inner wall of the duct. More specifically, the support 24 may have various configurations. Preferably, in the case of the sensor 34 for the comburent, the support 24 comprises an annular structure 25 positioned in contact with the inner wall of the second inlet 7 and a plurality of radial fins 26 which extend between the annular structure 25 and the conveyor 17.

In a second embodiment illustrated in FIGS. 10 to 13, the conveyor 17 is positioned inside the deflector element 31. More specifically, as shown in FIGS. 12 and 13, the second measuring means 13 are positioned between the inlet passage 33 and the inlet end 30. In this way, a part of the flow of comburent passes (by a Venturi effect) from the cylindrical zone 32 the inlet end 30 striking the sensor 34. Preferably, the second measuring means 13 are connected on the outer surface of the conveying duct but inside the cylindrical area 32. The conveyor 17 is aligned with the direction of entry of the comburent from the inlet passage 33 towards the inlet end of the conveying duct 9. In this way, the second measuring means 13 influence to a minimum extent the movement of the comburent entering from the inlet passage 33.

It should be noted that the first flow rate measuring means 12 and the second flow rate measuring means 13 are configured to generate a respective measuring signal. The measuring signal is preferably a signal of the electrical type and expressed in Volts or Amps.

Also, the device 11 comprises a control unit 16 operatively connected to the first measuring means 12 and to the second measuring means 13 and configured to receive the respective measuring signals.

In other words, the control unit 16 is configured to measure the flow rate Va of the comburent and of the fuel Vg as a function of the contents of the respective measuring signals.

In an alternative embodiment not illustrated in the accompanying drawings, the first measuring means 12 and/or the second measuring means 13 comprise at least two conveyors 17 inside each of which a respective sensor 34 is inserted. Advantageously, the presence of several conveyors 17 (and more sensors) makes it possible to obtain a greater safety in the operation of the control device 11 if at least one of the sensors fails or the flow of air in at least one conveyor 17 is blocked. In this case, the control unit 16 is configured to receive several measuring signals received from the sensors of the measuring means 12, 13 of the same type (air or gas) and for comparing them to each other in such a way as to check for any damage/malfunction of a sensor 34 or to check for any blocking of the conveyor.

In addition or alternatively, the control unit 16 is configured for comparing the measuring signals received from the sensors of the measuring means 12, 13 of the same type (air or gas) and for comparing them to each other in such a way as to adjust the flow rate value measured (for example, making an average) to increase the accuracy of the measurement.

In any case, the conveyors 17 of the measuring means 12, 13 of a same type (air or gas) are positioned at different zones in such a way as to measure the respective flow rates in different points.

The means for measuring the flow rate Vg of the fuel are mounted between the stabilizing valve 10 and the valve 5.

It should be noted that the sensor 34 of the first measuring means 12 and the sensor 34 of the second measuring means 13 are configured for measuring the flow rate or other quantities related to the latter (by mathematical formulas) such as speed.

Moreover, the device 11 comprises first operator means 14 for controlling the opening of the inlet valve 5 as a function of the quantity of fuel to be supplied to the burner 1. In other words, the first operator means 14 of the valve allow the quantity of fuel which passes in the first inlet 4 to be controlled. In yet other words, the first operator means 14 of the valve allow the quantity of fuel which passes in the duct for conveying the fuel 6 to be controlled.

Figure 3:
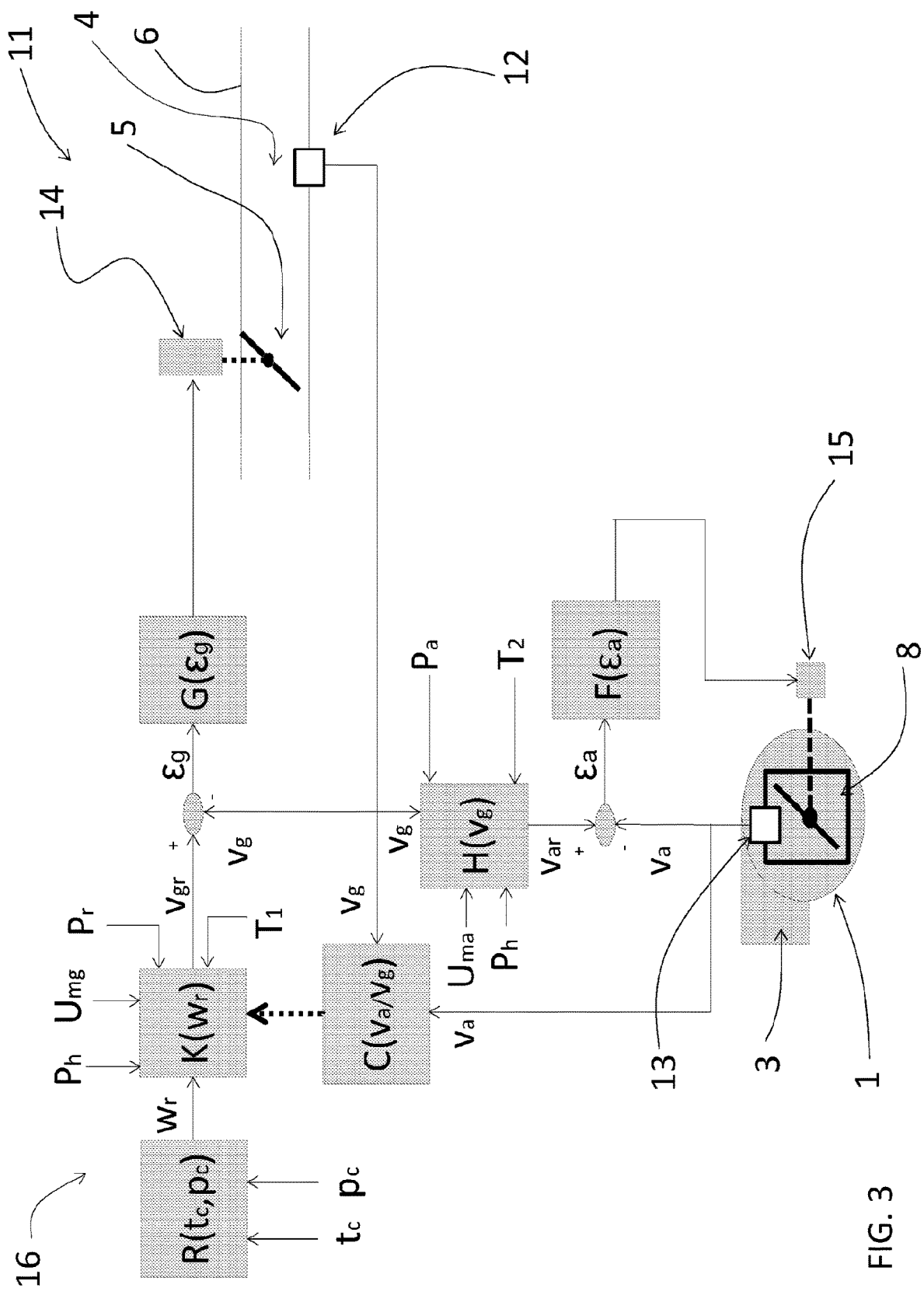
FIG. 3 shows a schematic view of a block diagram of the control of the combustion of the burner according to this invention.

It should also be noted that the first operator means 14 are mechanically connected to the valve 5 for moving it. Preferably, as shown in FIG. 3, the first operator means 14 comprise a servo-control.

Also, the device 11 comprises second operator means 15 of the means 8 for adjusting the quantity of comburent to control the passage of the comburent. In other words, the second operator means 15 of the valve allow the quantity of comburent which passes in the second inlet 7 to be controlled. In yet other words, the second operator means 15 of the valve allow the quantity of comburent which passes in the conveying duct 9 the fuel to be controlled.

Preferably, the second operator means 15 are mechanically connected to the shutters 36 which can be inclined to move them. Preferably, as shown in FIG. 3, the second operator means 15 comprise a servo-control.

If the means 8 for adjusting the quantity of comburent comprise the module for adjusting the rpm of the fan 27 for feeding air, the second operator means 15 are connected to the feeder (preferably an inverter) of the fan 27 for adjusting the flow of air generated. More specifically, the operator means 15 are configured to act on the shutters 36 and on the fan 27 as a function of a predetermined curve with a relationship between the flow of the inflowing comburent and the opening of the second inlet 7.

In other words, the operator means 15 are connected between the supply of the fan 27 and the shutters 36 in such a way as to control both the air flow generated by the fan 27 that the opening of the shutters 36. Preferably, the control means 15 comprise a control unit. In this case, the control unit also controls and manages the operator means 14 for adjusting the quantity of fuel supplied to the burner 1.

Also in a preferred embodiment, the operator means 15 are configured for controlling firstly the opening of the shutters 36 (until reaching an almost complete opening) and, subsequently, to control the increase in the rpm of the fan 27 in such a way as to optimise the supply of air. Alternatively, the ratio between rpm of the fan 27 and opening of the shutters 36 may be controlled in a different way related to the setting of the control unit 16.

The control unit 16 is operatively connected to the first operator means 14 and the second operator means 15 as a function of the values measured by the first measuring means 12 and by the second measuring means 13.

In other words, the control unit 16 is configured to receive the measuring signals and to generate control signals for controlling, respectively, the first operator means 14 and the second operator means 15.

More specifically, the opening 35 with an adjustable cross section is configured to generate an opening signal representing the opening movement. The control unit 16 is configured to receive the opening signal, comparing the contents of the opening signal with the trend of the flow rate of the comburent Va measured by the second measuring means 13 in such a way as to check whether the flow of the comburent is consistent with the movement of the opening 35 with an adjustable cross section. In other words, if the opening signal indicates that the cross section of the opening is increasing and if the flow of comburent is in turn increasing, this means that the flow of the comburent is consistent, or not, with the movement of the opening 35 with an adjustable cross section. On the contrary, if the opening signal indicates that the cross section of the opening 35 is reducing and if the flow of comburent is in turn decreasing, this means that the flow of the comburent is consistent with the movement of the opening 35 with an adjustable cross section.

If, on the other hand, the opening signal indicates that the cross section of the opening 35 is increasing (or decreasing) and if the flow of comburent is decreasing (or increasing or remains constant), this means that the flow of the comburent is not consistent with the movement of the opening 35 with an adjustable cross section.

If the flow of the comburent is not consistent with the movement of the opening 35 with an adjustable cross section, the control unit 16 is configured for generating an alarm signal.

Similarly to what was just described, the inlet valve 5 is configured to generate an opening signal representing the opening movement of the valve. More specifically, the control unit 16 is configured to receive the opening signal, comparing the contents of the opening signal with the trend of the flow rate of the fuel Vg measured by the first measuring means 12 in such a way as to check whether the flow of the fuel is consistent with the movement of the valve 5 or not. In other words, if the opening signal indicates that the valve is opening and if the flow of fuel is in turn increasing, this means that the flow of the fuel is consistent with the movement of the valve. On the contrary, if the opening signal indicates that the valve 5 is closing and if the flow of fuel is in turn decreasing, this means that the flow of the fuel is consistent with the movement of the valve 5.

If, on the other hand, the opening signal indicates that the valve is opening (or closing) and if the flow of fuel is decreasing (or increasing or remains constant), this means that the flow of the fuel is no consistent with the movement of the valve.

If the flow of the fuel is not consistent with the movement of the valve 5, the control unit 16 is configured for generating an alarm signal.

It should also be noted that the second means 13 for measuring the flow rate of the comburent are positioned upstream of the adjustment means 8 in a feed direction of the comburent.

More in detail, the second means 13 for measuring the flow rate of the comburent are positioned upstream of the fan 27 in a feed direction of the comburent.

In this way, the measuring means 13 are influenced in a minimal manner by the turbulence created by the fan 27 and by the movement of the adjustment means 8. Also, the measuring means are more easily removed if replacement is necessary.

Similarly, the first means 12 for measuring the flow rate of the fuel are also located upstream of the inlet valve 5 in a feed direction of the fuel in such a way that they are influenced in a minimal manner by movements of the inlet valve 5.

In accordance with this invention, the control unit 16 is configured to perform a first feedback check to control the first operator means 14 and a second feedback check to control the second operator means 15. During the first feedback check the control unit 16 is configured for:

generating an ideal flow rate value Vgr of the fuel (corresponding to a value in Volts or Amps) as a function of the predetermined thermal power value Wr for the burner 1 (function K(Wr));

measuring the flow rate of fuel Vg (corresponding to a value in Volts or Amps) fed to the burner 1 through the first measuring means 12;

comparing the measured fuel flow rate value Vg with the ideal flow rate value Vgr and generating a corresponding offset value sg as a function of the difference between the measured flow rate value Vg and the ideal flow rate value Vgr;

controlling (function G($\varepsilon$g)) the first operator means 14 to adjust the opening of the inlet valve 5 as a function of the generated offset value sg in such a way that the measured fuel flow rate value approximates the ideal fuel flow rate value Vgr.

It should be noted that the step of generating the ideal flow rate Vgr of the fuel as a function of a predetermined thermal power value Wr is performed by the use of a power/flow rate equation which provides a relationship of a plurality of thermal power values Wr which can be selected by an operator (or supplied by the modulator R(tc, pc) on the basis of the energy requirement of the plant) with a corresponding ideal fuel flow rate value Vgr. The predetermined thermal power value Wr is preferably calculated by a modulator R(tc, pc) (also forming part of the burner) as a function of values measured in the apparatus in which the burner is mounted (for example, in the case of a boiler the temperature values tc of the water or the pressure values pc of the steam are measured on the basis of which the modulator calculates the thermal power value Wr). In any case, the thermal power value Wr depends on the quantity of heat requested by the user. Preferably, the R(tc, pc) modulator is implemented in the control device 1.

Also, the control unit 16 comprises a memory module which stores the power/flow rate equation for a predetermined calorific power dependent on the type of fuel used.

In addition, the ideal flow rate Vgr is preferably an electrical quantity.

Also, the comparison of the measured instantaneous fuel flow rate value Vg with the ideal flow rate Vgr is performed using a suitable comparison module.

Also, it should be noted that the control unit 16 is configured (function G($\varepsilon$g)) to increase the opening of the inlet valve 5 if the ideal flow rate value Vgr is greater than the measured flow rate value Vg and to reduce the opening of the inlet valve 5 if the ideal flow rate value Vgr is less than the measured flow rate value Vg.

As mentioned, the control unit 16 is configured to perform a second feedback check on the second operator means 15 by performing the following operations:

measuring the flow rate of comburent Va (corresponding to a value in Volts or Amps) fed to the burner 1 through the second measuring means 13;

generating an ideal flow rate value Var (corresponding to a value in Volts or Amps) for the comburent as a function of the measured fuel flow rate according to a predetermined curve of values H(Vg) representing the relation between the ideal comburent flow rate Var and the fuel flow rate Vg;

comparing the measured combustion air flow rate value Va with the ideal comburent flow rate value Var and generating a corresponding offset value Ea as a function of the difference between the measured flow rate value Va and the ideal flow rate value Var;

controlling (function F($\varepsilon$g)) the second operator means 15 to adjust the flow of the comburent into the second inlet 7 as a function of the generated offset value Ea in such a way that the measured comburent flow rate value Va approximates the ideal comburent flow rate value Var.

It should be noted that the step of generating the ideal flow rate value Var for the comburent as a function of the measured fuel flow rate is performed by using a predetermined curve (function H(Vg)) representing the ratio between the ideal comburent flow rate Var and the fuel flow rate Vg. The curve of the values is preferably stored in the memory module of the control unit 16.

In addition, the ideal flow rate value Var of the comburent is preferably an electrical quantity.

Also, the comparison of the measured comburent flow rate value Va with the ideal flow rate Var is performed using a suitable comparison module.

Also, it should be noted that the control unit 16 is configured (function F($\varepsilon$g)) to increase the passage of comburent if the ideal flow rate value Var is greater than the measured flow rate value Va and to reduce the passage of the comburent if the ideal flow rate value Var is less than the measured flow rate value Va.

Advantageously, the first feedback check and the second feedback check control whether the combustion is maintained within the optimum limits and close both to the ideal fuel flow rate value Vg, with regards to the addition of fuel, and to the flow rate values Va of the ideal comburent Va, with regards the addition of air. In this way, the system self adjusts, keeping constant the combustion even with variations to the values of the fuel Vg and/or the comburent Va flow rate values.

In effect, whilst the first feedback check tends to keep the fuel flow rate value Vg close to an optimum flow rate value pre-calculated as a function of the power Wr set, the second feedback check tends to keep the comburent flow rate value Va close to an optimum flow rate value calculated as a function of the measured fuel flow rate value. In this way, the system self adjusts. Preferably, each feedback check defines a control of the proportional-integral-derivative (PID) type.

In addition, the device 11 comprises a first temperature sensor positioned in the first inlet 4 and configured to measure the temperature of the fuel. More specifically, the control unit 16 is connected to the first temperature sensor to receive a temperature signal T1 and is configured to determine the ideal flow rate Vgr of the fuel as a function of the temperature value T1 measured.

In other words, the generation of the ideal fuel flow rate value Vgr takes into account the measured temperature value T1. More specifically, the control unit 16 modifies the ideal fuel flow rate value Vgr as a function of the temperature value T1 measured according to predetermined mathematical expressions.

In addition, the device 11 comprises a second temperature sensor positioned in the second inlet 7 and configured to measure the temperature of the comburent. More specifically, the control unit 16 is connected to the second temperature sensor to receive a temperature signal T2 and is configured to determine the ideal flow rate Var of the comburent as a function of the temperature value T2 measured.

In other words, the generation of the ideal comburent flow rate value Var takes into account the measured temperature value T2. More specifically, the control unit 16 modifies the ideal comburent flow rate value Vgr as a function of the temperature value T2 measured according to predetermined mathematical expressions.

In addition to the temperature sensor, the device 11 may comprise a pressure sensor Pr positioned in the first inlet 4 and configured to measure the pressure Pr of the fuel. The control unit 16 is configured to determine the ideal fuel flow rate value Vgr as a function of the measured pressure value Pr. In other words; the generation of the ideal fuel flow rate value Vgr takes into account the measured pressure value Pr. More specifically, the control unit 16 modifies the ideal fuel flow rate value Vgr as a function of the pressure value Pr measured according to predetermined mathematical expressions.

Also, the device 11 may comprise a pressure sensor of the comburent Pa positioned in the second inlet 7 and configured to measure the pressure Pa of the incoming comburent. The control unit 16 is configured to determine the ideal comburent flow rate value Var as a function of the measured value of comburent pressure Pa.

In other words, the generation of the ideal comburent flow rate value Var may also take into account the measured atmospheric pressure value Ph of the comburent. More specifically, the control unit 16 modifies the ideal comburent flow rate value Vgr as a function of the pressure value Pr of the comburent measured according to predetermined mathematical expressions.

Also, the device 11 may comprise an atmospheric pressure sensor pH positioned in the second inlet 7 and configured to measure the external atmospheric pressure pH. The control unit 16 is configured to determine the ideal fuel flow rate value Var and/or the ideal comburent flow rate value Var as a function of the measured atmospheric pressure value Ph. In other words, the generation of the ideal flow rate value of the fuel Vgr and/or of the comburent Var may also take into account the measured atmospheric pressure value Ph. More specifically, the control unit 16 can modify the ideal fuel flow rate value Vgr of the fuel and/or Var of the fuel as a function of the atmospheric pressure value Pr measured according to predetermined mathematical expressions.

In addition, the device 11 may comprise a first humidity sensor Uma positioned in the second inlet 7 and configured to measure the humidity of the comburent. The control unit 16 is configured to determine the ideal comburent flow rate value Var as a function of the measured humidity value Uma. In other words, the generation of the ideal comburent flow rate value Var may take into account the measured humidity value Uma. More specifically, the control unit 16 can modify the ideal comburent flow rate value Vgr as a function of the humidity value Uma measured according to predetermined mathematical expressions.

In addition, the device 11 may comprise a second humidity sensor Umg positioned in the first inlet 4 and configured to measure the humidity of the fuel. The control unit 16 is configured to determine the ideal fuel flow rate value Vgr as a function of the measured humidity value Umg. In other words, the generation of the ideal fuel flow rate value Vgr may also take into account the measured humidity value Umg. More specifically, the control unit 16 modifies the ideal fuel flow rate value Vgr as a function of the humidity value Umg measured according to predetermined mathematical expressions.

Moreover, the control unit 16 is further configured to:
- define a ratio C(Va/Vg) between the measured comburent flow rate value Va and the measured fuel flow rate value Vg;
- to compare this ratio C(Va/Vg) with a predetermined range of safe combustion values;
- if the ratio C(Va/Vg) falls outside the predetermined range of safe combustion values, to control the first operator means 14 to close the inlet valve 5 in order to shut down the burner 1.

Advantageously, this control makes it possible to keep the combustion within a predetermined range of values in such a way that it does not produce harmful gases such as, for example, CO, NOX, etc.

It should be noted that the ratio C(Va/Vg) between the comburent flow rate value Va and the measured fuel flow rate value Vg is also known as the "excess air index" and is indicated with the symbol l (lambda). Is also known that if the excess air index l remains around a predetermined optimum range (substantially defined around the value recommended by regulation "UNI EN 676" for gaseous fuels and by regulation "UNI EN 267" for liquid fuels and preferably equal to approximately 1.16) the combustion does not produce harmful gases if the coupling between the burner 1 and the apparatus to which is coupled (for example a boiler) is correct and the burner 1 has been installed correctly.

Consequently, the control unit 16 is configured for comparing the ratio between the measured flow rate value Va of the comburent and the measured flow rate value Vg of the fuel with that predetermined optimum range. If the ratio C(Va/Vg) calculated remains within the predetermined optimum range, it means that the combustion does not produce harmful gases and operates in a field of use in accordance with the relative reference regulations. If the ratio C(Va/Vg) calculated leaves the predetermined optimum range, the control unit 16 is configured to act on the first operator means 14 so as to close the inlet valve 5 in such a way as to shut down the burner 1.

It should be noted that the above-mentioned control device may form part of an assembly kit to be added to a burner already installed.

This invention also relates to a method for controlling the combustion of a burner 1 of the type described above. It should be noted that the control method is derived directly from what is described above, which is here below incorporated in its entirety.

More specifically, the method comprises generating an ideal flow rate value Vgr for the fuel as a function of the predetermined thermal power value Wr for the burner 1. The step of generating the ideal flow rate value Vgr is performed as a function of a power/flow equation K(Wr) with a relationship between the thermal power Wr of the burner 1 and an ideal fuel flow rate value Vgr.

Subsequently, the method comprises a first step of measuring the flow rate of fuel Vg fed to the burner 1 through the first measuring means 12.

Moreover, the method comprises a subsequent step of comparing the measured fuel flow rate value Vg with the ideal flow rate value Vgr and generating a corresponding offset value εg as a function of the difference between the measured flow rate value Vg and the ideal flow rate value Vgr;

Subsequently, the method comprises adjusting (function G(εg)) the opening of the inlet valve 5 as a function of the generated offset value εg in such a way that the measured flow rate value Vg approximates the ideal fuel flow rate value Vgr. More specifically, if the ideal flow rate Vgr is greater than the measured flow rate value Vg the opening of the inlet valve 5 is increased. If the ideal flow rate value Vgr is less than the flow rate value Vg the opening of the inlet valve 5 is reduced.

Also, simultaneously with the steps listed above, the method comprises a step of generating (function H(Vg)) an ideal flow rate value Var for the comburent as a function of the measured fuel flow rate value Vg according to a predetermined curve of values H(Vg) representing the relation between the ideal comburent flow rate Va and the fuel flow rate Vg. That curve H(Vg) of values is predetermined as a function of the type of burner 1 and defines an optimum and ideal ratio between the ideal comburent flow rate value Var and the fuel flow rate Vg.

Subsequently, the method comprises measuring the flow rate Va of the comburent supplied to the burner 1 using the second flow rate measuring means 13;

Moreover, the method comprises comparing the measured combustion air flow rate value Va with the ideal comburent flow rate value Var and generating a corresponding offset value sa as a function of the difference between the measured flow rate value Va and the ideal flow rate value Var.

Lastly, the method comprises adjusting the flow of the comburent into the second inlet 7 as a function of the generated offset value εa in such a way that the measured comburent flow rate value Va approximates the ideal comburent flow rate value Var. In other words, if the ideal flow rate Var is greater than the measured flow rate value Va the quantity of comburent supplied is increased. If the value of the ideal flow rate Var is less than the measured flow rate value Va, the quantity of comburent supplied is reduced.

The invention achieves the preset aims.

More specifically, the control of the burner implemented by the device according to this invention allows the combustion to be regulated automatically by the continuous and instantaneous measurement of the flow rate of the comburent flow rate and the fuel flow and through a double feedback check system. More specifically, the control system allows the value of the measured fuel flow value to be kept close to a flow rate value pre-calculated as a function of the power required and the comburent flow rate to be kept close to an optimum flow rate value calculated as a function of the measured fuel flow rate. In this way, the system self adjusts.

Consequently, the presence of a trained operator is no longer necessary for setting the air/gas ratio curve in particular during start up since the combustion remains at an optimum level and it self adjusts. In other words, the control device makes it possible to avoid both the initial and regular settings for the adjustments of comburent and fuel by trained personnel.

In addition, there is no need for the use of the fumes analysis instrument by the external operator since the fuel/comburent ratio curves are already pre-set in the factory in order to maintain an optimum combustion.

In addition, this invention also makes it possible to eliminate the air differential pressure switch present in many burners to measure the pressure difference of the comburent upstream of the adjusting shutter 36 and of the comburent at the head. In effect, the presence of the flow rate sensor makes it possible to determine the presence or absence of the comburent (and hence directly check if the shutters 36 are blocked or operating normally) without having to use the differential pressure switch. In this way, this invention gives greater safety to the burner since, whilst the pressure switch is adjusted manually by an operator (who might perform an imprecise adjustment or the pressure switch might be tampered with), the control device according to this invention does not require manual calibration of the pressure switch since it is based on measurements performed by the sensor.

In addition, the control device self adjusts as a function of the parameters of the comburent and/or fuel present in a particular location, thereby resolving the problems linked to the dependence of particular local factors which might influence the combustion (for example, in the case of installation at a height where the air is more rarefied).

Also, the burner defines an integrated and single system with internal control in such a way that it is easy to install on any user device.

Lastly, it should be noted that the burner according to this invention adapts automatically to the reference regulations for the safety of burners as it is pre-set to comply with the regulations when it leaves the factory.

It should also be noted that this invention is relatively easy to implement and that the cost of implementing the invention is relatively low.

The invention claimed is:

1. A combustion control device for a burner comprising a first inlet for the fuel, having an inlet valve for adjusting the quantity of fuel supplied, and a second inlet for the comburent, wherein the second inlet comprises a conveying duct extending along a respective axis of extension from a respective inlet end of the comburent, comprising a comburent flow regulator which adjusts the quantity of comburent supplied, the device comprising:
   a deflecting element for deflecting the incoming comburent configured for introducing the comburent in a radial direction relative to the axis of extension, wherein the deflector element is shaped in the form of a cap positioned on the inlet end of the comburent and having a respective internal cross-section larger than the cross-section the inlet end in such a way as to form a cylindrical air inlet zone between the conveying duct and the deflector element;
   a first sensor which measures the flow rate of the fuel which, in use, is supplied to the burner;
   a second sensor which measures the flow rate of the comburent which, in use, is supplied to the burner, the second sensor being positioned inside the deflector element;
   a first operator valve which controls the opening of the inlet valve as a function of the quantity of fuel to be supplied to the burner;
   a second operator valve which controls the comburent flow regulator as a function of the quantity of comburent to be supplied to the burner;
   a control unit for controlling the first operator valve and the second operator valve as a function of the values measured by the first sensor and by the second sensor;
   the control unit being configured to perform a second feedback check on the second valve by performing the following operations:
      generating an ideal flow rate value for the comburent as a function of the measured fuel flow rate according to a predetermined curve of values representing the relation between the ideal comburent flow rate and the fuel flow rate;
      measuring the flow rate of the comburent supplied to the burner;
      comparing the measured comburent flow rate value with the ideal comburent flow rate value and generating a corresponding offset value as a function of the difference between the measured comburent flow rate value and the ideal comburent flow rate value; and
      controlling the second operator valve to adjust the flow of the comburent into the second inlet as a function of the generated offset value in such a way that the measured comburent flow rate value approximates the ideal comburent flow rate value;
   wherein the control unit is configured to perform a first feedback check on the first operator valve by performing the following operations:
      generating an ideal flow rate value for the fuel as a function of the predetermined thermal power value for the burner and the measured comburent flow rate value, thereby adjusting a reference value for the fuel to the measured comburent;
      measuring the flow rate of the fuel supplied to the burner;
      comparing the measured fuel flow rate value with the ideal flow rate value and generating a corresponding offset value as a function of the difference between the measured fuel flow rate value and the ideal fuel flow rate value; and
      controlling the first operator valve to adjust the opening of the inlet valve as a function of the generated offset value in such a way that the measured fuel flow rate value approximates the ideal fuel flow rate value;
   wherein the control unit is configured to:
      define a ratio between the measured comburent flow rate value and the measured fuel flow rate value;
      compare this ratio with a predetermined range of safe combustion values; and
      if the ratio falls outside the predetermined range of safe combustion values, to control the first operator valve to close the inlet valve in order to shut down the burner;
   the first sensor and the second sensor comprising respective fuel and comburent conveyors, each extending along a fuel or comburent feed direction from a wide end to a narrow end in which a flow rate measuring sensor is mounted;
   said first sensor comprising one sensor configured to directly measure the flow rate of fuel and the second sensor comprising another sensor configured to directly measure the flow rate of the comburent;
   each of the first sensor and the second sensor being an anemometer of the hot film or hot wire type; and
   the conveyors being positioned inside the respective first inlet and second inlet and forming an internal passage section less than the section of the respective inlet in such a way that most of the fuel or comburent passes outside the respective conveyor.

2. The device according to claim 1, wherein the first sensor and the second sensor comprise respective supports each connected between the conveyor and the respective inlet for keeping the conveyor in a central position relative to the transversal section of the inlet.

3. The device according to claim 2, wherein each conveyor extends along a feed direction of the comburent or fuel from a wide end to a narrow end at which the measuring sensor is positioned.

4. The device according to claim 1, wherein the device comprises a first temperature sensor configured to measure the temperature of the fuel; the control unit being configured to determine the ideal flow rate value of the fuel as a function of the measured temperature value.

5. The device according to claim 1, wherein the device comprises a second temperature sensor configured to measure the temperature of the comburent; the control unit being configured to determine the ideal flow rate value of the comburent as a function of the measured temperature value.

6. The device according to claim 1, wherein the device comprises a pressure sensor configured to measure the pressure of the fuel; the control unit being configured to determine the ideal flow rate value of the fuel as a function of the measured pressure value.

7. The device according to claim 1, wherein the device comprises a pressure sensor configured to measure the pressure of the incoming comburent; the control unit being configured to determine the ideal flow rate value of the comburent as a function of the measured comburent pressure value.

8. The device according to claim 1, wherein the first sensor and the second sensor are configured to generate a respective measuring signal; the control unit being configured to measure the flow rate of the comburent and of the fuel as a function of the contents of the respective measuring signals.

9. A burner, comprising:
a first fuel inlet in which there is an inlet valve which adjusts the quantity of fuel supplied;
a second inlet for the comburent, comprising a comburent flow regulator which adjusts the quantity of comburent supplied, wherein the second inlet comprises a conveying duct extending along a respective axis of extension from a respective inlet end of the comburent;
a combustion zone where the first inlet and the second inlet merge and where the fuel and the comburent mix to allow combustion to take place;
the burner comprising an element for deflecting the incoming comburent configured for introducing the comburent in a radial direction relative to the axis of extension, wherein the deflector element is shaped in the form of a cap positioned on the inlet end of the comburent and having a respective internal cross-section larger than the cross-section inlet end in such a way as to form a cylindrical air inlet zone between the conveying duct and the deflector element;
wherein the burner comprises a control device comprising:
a first sensor which measures the flow rate of the fuel that, in use, is supplied to the burner;
a second sensor which measures the flow rate of the comburent that, in use, is supplied to the burner, the second sensor being positioned inside the deflector element;
a first operator valve which controls the opening of the inlet valve as a function of the quantity of fuel to be supplied to the burner;
a second operator valve which controls the comburent flow regulator as a function of the quantity of comburent to be supplied to the burner;
a control unit for controlling the first operator valve and the second operator valve as a function of the values measured by the first sensor and by the second sensor;
the control unit being configured to perform a second feedback check on the second valve by performing the following operations:
generating an ideal flow rate value for the comburent as a function of the measured fuel flow rate according to a predetermined curve of values representing the relation between the ideal comburent flow rate and the fuel flow rate;
measuring the flow rate of the comburent supplied to the burner;
comparing the measured comburent flow rate value with the ideal comburent flow rate value and generating a corresponding offset value as a function of the difference between the measured comburent flow rate value and the ideal comburent flow rate value; and
controlling the second operator valve to adjust the flow of the comburent into the second inlet as a function of the generated offset value in such a way that the measured comburent flow rate value approximates the ideal comburent flow rate value;
wherein the control unit is configured to perform a first feedback check on the first operator valve by performing the following operations:
generating an ideal flow rate value for the fuel as a function of the predetermined thermal power value for the burner and the measured comburent flow rate value, thereby adjusting a reference value for the fuel to the measured comburent
measuring the flow rate of the fuel supplied to the burner;
comparing the measured fuel flow rate value with the ideal flow rate value and generating a corresponding offset value as a function of the difference between the measured fuel flow rate value and the ideal fuel flow rate value; and
controlling the first operator valve to adjust the opening of the inlet valve as a function of the generated offset value in such a way that the measured fuel flow rate value approximates the ideal fuel flow rate value; and
wherein the control unit is configured to:
define a ratio between the measured comburent flow rate value and the measured fuel flow rate value;
compare this ratio with a predetermined range of safe combustion values; and
if the ratio falls outside the predetermined range of safe combustion values, to control the first operator valve to close the inlet valve in order to shut down the burner.

10. The burner according to claim 9, wherein the first sensor for measuring the flow rate of the fuel is mounted inside the first inlet in the proximity of the combustion zone and the second sensor for measuring the flow rate of the comburent is mounted inside the second inlet in the proximity of the combustion zone.

11. The burner according to claim 9, wherein the first inlet and the second inlet are defined by respective conveying ducts; each conveyor being positioned inside a respective duct and being connected to the latter by a support connected between the conveyor and the duct to keep the conveyor in a central position relative to the transversal section of the inlet.

12. The burner according claim 9, wherein the burner comprises a pressure stabilizing valve located along the first inlet upstream of the combustion zone and configured to keep fuel pressure constant between the stabilizing valve and the combustion zone; the sensor which measures the flow rate of the fuel being mounted between the stabilizing valve and the combustion zone.

13. The burner according to claim 9, wherein the comburent flow regulator has an adjustable opening to adjust the quantity of comburent supplied.

14. The burner according to claim 9, comprising a fan for supplying air in the direction of the combustion zone in order to feed air thereto.

15. The burner according to claim 14, wherein the second sensor which measures the comburent flow rate is positioned upstream of the fan in a feed direction of the comburent.

16. The burner according to claim 9, wherein the inlet valve is configured to generate an opening signal representing the opening movement of the inlet valve; the control unit being configured to receive the opening signal, comparing the contents of the opening signal with the trend of the fuel flow rate value measured by the first sensor in such a way as to check whether the flow of the fuel is consistent with the movement of the inlet valve or not.

17. The burner according to claim 9, wherein the first sensor of the fuel flow rate (Vg) is positioned upstream of the inlet valve in a feed direction of the fuel (Vg).

* * * * *